2,985,669

3β-ACETOXY-6-METHYL CHOLESTANE, PROCESS AND INTERMEDIATES IN THE PRODUCTION THEREOF

Georges Muller, Nogent S/Marne, France, assignor to Les Laboratoires Francais de Chimiotherapie, Paris, France, a corporation of France No Drawing. Filed Feb. 16, 1959, Ser. No. 793,253

Claims priority, application France Feb. 18, 1958

5 Claims. (Cl. 260—397.2)

The present invention relates to a process of preparing 6-methyl steroids from 6-keto steroids, and products obtained thereby.

6-methyl steroids, especially 6α-methyl-Δ¹-dehydrocortisol and 6α-methyl-9α-fluoro-Δ¹-dehydrocortisol, possess, according to the literature, a corticosteroid activity which is clearly superior to that of the corresponding non-methylated Δ¹-dehydrocortisol and 9α-fluoro-Δ¹-dehydrocortisol.

The methods of producing such 6-methyl steroids as described in the literature proceed generally in such a manner that the methyl group is introduced into the molecule at the end of the synthesis of such compounds. This requires the use of compounds as starting materials which have been produced in a rather elaborate manner by a synthesis comprising numerous reaction steps. The yield, therefore, is quite low, since it is necessary to protect those groups in the molecule of the starting, intermediate, and final products which are incompatible with the reagents used, during the entire synthesis.

It is the one object of the present invention to provide a simple and effective process of preparing 6-methyl steroids from 6-keto steroids. Other objects of the present invention and advantageous features thereof will become apparent as the description proceeds. In principle the process according to the present invention consists in converting 6-keto steroids of Formula I into the corresponding 6-methylene substituted steroids of Formula II, the catalytic reduction of which yields 6-methyl steroids of Formula III. The reaction proceeds according to the following simplified equation wherein only rings A and B of the steroid ring system are illustrated.

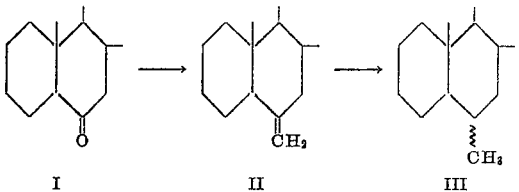

I      II      III

The process according to the present invention permits to use commercially readily available starting materials and to introduce the methyl group into the 6-position of such inexpensive commercial products, such as cholesterol, trans-dehydroandrosterone, Δ¹⁶-pregnenolone, hyodesoxycholic acid, or desoxycholic acid and their derivatives. These compounds are subsequently converted by the methods known to the steroid chemist into 6-methyl derivatives of androgenic, progestational, or adrenocortical hormones.

The starting 6-keto steroids, as far as they are not described in the literature, are obtained by oxidation of a 6-hydroxy steroid compound occurring in nature or of a 6-hydroxy steroid compound obtained by biological hydroxylation by means of an appropriate microorganism, or by converting a steroid with a 5,6-double bond into the corresponding 6-nitro compound and then reducing said 6-nitro compound to a 6-ketone derivative of the allo-series, i.e., of a compound wherein rings A and B are in trans-position.

The process according to the present invention may be applied equally well to 6-keto steroids of the allo-series (rings A/B in trans-position) as to those of the normal series (rings A/B in cis-position). It is, of course, understood that any ketone, aldehyde, alcohol, or carboxyl groups present in the starting materials in positions other than the 6-position must be protected during the reaction according to the present invention in the form of suitable derivatives which can readily be reconverted into such other groups, once the 6-methyl group is introduced, either immediately thereafter or in the course of further synthesis. The hydroxyl groups may advantageously be protected by conversion into ester groups, and the ketone or aldehyde groups by conversion into ketal or enol ether groups. Conversion of the 6-keto group into the 6-methylene group according to the present invention is effected by reacting the ketone compound with a triphenyl methyl phosphonium salt in the presence of lithium alkyl or aryl. Subsequently the resulting 6-methylene compound is catalytically reduced to the 6-methyl group.

According to the nature of the hydrogenation catalyst used, the hydrogenation product may be a mixture of compounds in which either the 6α-methyl compound or the 6β-methyl compound predominates.

It is not necessary to isolate the one or the other stereoisomeric form for carrying out subsequent reactions. The 6α-form is more stable than the 6β-form and forms automatically in an alkaline medium, as soon as a 4,5-double bond is introduced into the molecule in conjugation to the 6-methyl group. Such a 4,5-double bond is characteristic for and present in the majority of 3-keto steroid compounds used in therapy.

According to the process of the present invention, there can be obtained, for instance, the acetate of 6-methyl cholestane-3β-ol from the acetate of 6-keto cholestane-3β-ol. Said 6-methyl compound can be oxidized by means of chromic acid to 3β-acetoxy-6-methyl androstane-17-one, which is converted, by a treatment with N-bromo succinimide in the presence of benzyl alcohol, according to the process of Patent No. 2,768,189 into 2,4-dibromo-6-methyl androstane-3,17-dione.

The resulting 2,4 dibromo-6-methyl androstane-3,17-dione is then dehydrobrominated in a manner known per se to introduce two double bonds in ring A and the ketone group in 17-position is finally reduced to yield 6α-methyl-Δ¹-testosterone.

By esterification of hyodesoxycholic acid to the methyl ester of said acid and reaction of said ester with phenyl magnesium bromide, there is obtained, after acetylation with acetic acid anhydride, 3α,6α-diacetoxy-24,24-diphenyl-Δ²³-cholene. This compound is saponified to 3α,6α-dihydroxy-24,24-diphenyl-Δ²³-cholene which can be selectively oxidized in the same manner, as described for hyodesoxycholic acid to yield 3α-hydroxy-6-keto-24,24-diphenyl-Δ²³-cholene. The process according to the present invention permits conversion of said compound after acetylation into 3α-acetoxy-6-methyl-24,24-diphenyl-Δ²³-cholene which, subjected to the degradation process according to Meystre et al. "Helvetica Chimica Acta" vol. 28, p. 1252 (1945) and vol. 30, p. 1037 (1947), yields 3α-acetoxy-6-methyl pregnane-20-one. This compound can be transformed by saponification and bromo oxidation according to Patent No. 2,768,189 into 4-bromo-6-methyl pregnane-3,20-dione. Dehydrobromination of said compound by means of a pyridine base yields 6-methyl progesterone. The 3α-acetoxy-6-methyl pregnane-20-one can also be converted into compound S having a methyl group in 6-position by a series of reaction steps as they are described, for instance, in the standard text book "Substances naturelles de synthèse" vol. 6, p. 52, Masson (1953), for the conversion of pregnene-3-ol-20-one into compound S. Since these reaction steps and procedures are well known to those skilled in this art, they need not be repeated here.

Biological hydroxylation of compound S substituted in 6-position by a methyl group finally yields 6-methyl cortisol.

It is evident from the foregoing description of examples of producing valuable compounds that the process according to the present invention permits the preparation of valuable 6-methyl substituted 3-keto steroid compounds having double bonds between the 4,5 carbon atoms and/or between the 1,2-carbon atoms by using inexpensive starting materials or compounds that heretofore have not been used as starting materials, such as hyodesoxycholic acid.

The following examples serve to illustrate the present invention without, however, limiting the same thereto.

More in particular, other lithium alkyl or aryl compounds than those mentioned in the examples may be used in the reaction with triphenyl methyl phosphonium halide. Catalytic reduction of the methylene group to the methyl group may be effected with the aid of other catalysts than those mentioned. The temperature and/or the nature of the solvent employed may also be varied.

The melting points given in the examples are points of instantaneous melting determined on the Maquenne block.

EXAMPLE 1

*Preparation of 3β-acetoxy-6-methyl cholestane starting from 3β-acetoxy cholestane-6-one*

(a) PREPARATION OF THE 6-METHLYENE COMPOUND 8 g. of triphenyl methyl phosphonium bromide are introduced with stirring into 90 cc. of benzene. About 10 cc. of solvent are distilled off; then, 2 g. of phenyl lithium are added in the form of 13.5 cc. of a 14.8% solution of this compound in ether. The mixture takes on a yellow color, then turns orange, and finally becomes light brown. After refluxing for one hour with stirring, 2 g. of 3β-acetoxy cholestane-6-one, prepared according to Fieser "J. Am. Chem. Soc.," vol. 76, p. 532 (1954), are introduced. Said compound has a melting point of 130° C., its optical rotation is $[\alpha]_D^{20}=-12°$ (concentration=0.5% in chloroform). The mixture is again refluxed for one hour without interrupting the stirring. Thereafter the reaction mixture is cooled to 20° C. Water is added and the resulting mixture is acidified by the addition of hydrochloric acid to a pH of 1.0. The organic solvent layer is then decanted and the aqueous phase is extracted with methylene chloride. The combined organic solvent layers are washed with water and subsequently with sodium bicarbonate solution, dried over magnesium sulfate, and evaporated to dryness. The product which becomes partially deacetylated during these operations, is reacetylated by heating at 60° C. with 12 cc. of acetic acid anhydride and 15 cc. of pyridine for one hour. The reaction mixture is concentrated by evaporation in a vacuum to a volume of a few cc. and 2 cc. of water are added thereto. The mixture is allowed to stand at room temperature for 15 minutes. Petroleum ether (boiling point: 50–70° C.) is added to and extracts the methylene steroid compound without dissolving a resin which has been formed as a by-product of the reaction. The petroleum ether extract is washed with N hydrochloric acid, then with water, thereafter with sodium bicarbonate solution, and again with water. The washed extract is dried over magnesium sulfate and filtered through a small amount of neutral aluminum oxide which retains the impurities.

The filtered solution is evaporated to dryness and the residue is recrystallized from ethoxy methanol. After drying, 1.6 g. of the methylene compound are obtained, corresponding to a yield of 80% of the theoretical yield; melting point: 127–128° C. For analytical purposes the compound is recrystallized from a mixture of ether and methanol. Melting point: 128° C., optical rotation $[\alpha]_D^{20}=-6°$ (concentration=0.5% in chloroform). The compound is very slightly soluble in methanol, soluble in petroleum ether, and very soluble in ether and chloroform. It sublimates in a vacuum at about 100° C.

This compound is new.

*Analysis.*—$C_{30}H_{50}O_2$; molecular weight: 442.70.—Calculated: 81.4% C, 11.4% H, 7.2% O. Found: 81.6% C, 11.5% H, 7.8% O.

(b) REDUCTION OF THE 6-METHLYENE COMPOUND

The mixture of 1 g. of carbon black, 50 cc. of distilled water, 1 g. of potassium acetate, and 0.5 cc. of a 20% aqueous solution of palladium chloride is saturated with hydrogen, filtered, washed successively with water, alcohol, and ethyl acetate.

1 g. of 3β-acetoxy-6-methylene cholestane obtained as described hereinabove is dissolved in 100 cc. of ethyl acetate and the palladium precipitated on carbon black, prepared as described, is added and hydrogen is introduced into the mixture. As soon as hydrogenation is completed, the catalyst is filtered off and washed with ethyl acetate. The wash solvents are added to the filtrate which is then evaporated to dryness. After recrystallization of the evaporation residue from a mixture of ether and methanol (1:2), 800 mg. of the 3-acetate of 6-methyl cholestane-3β-ol of the melting point: 120° C. are obtained; after recrystallization from acetone, the compound is sufficiently pure for analysis; its melting point is 142° C., its optical rotation $[\alpha]_D^{20}=-10°$ (concentration: 0.5% in chloroform). The compound is very slightly soluble in methanol and very soluble in ether and chloroform.

*Analysis.*—$C_{30}H_{52}O_2$; molecular weight: 444.72.—Calculated: 81.0% C; 11.8% H; 7.2% O. Found: 81.0% C; 11.7% H; 7.6% O.

This compound is new.

EXAMPLE 2

*Preparation of the dipropionate of 6-methyl-5α-androstane-3β,17β-diol*

(a) PREPARATION OF THE 3,17-DIPROPIONATE OF 6-NITRO-Δ⁵-ANDROSTENE-3β,17β-DIOL

To a mixture of 10 cc. of glacial acetic acid and 20 cc. of nitric acid of 48° Bé($d$=1.495) which is cooled to 0° C., 5 g. of the dipropionate of $\Delta^5$-androstene-3β,17β-diol are introduced with stirring while maintaining the temperature at 0° C. The mixture is kept at the same temperature for about 10 minutes. The reaction solution is then poured on ice. The resulting crude nitro compound is filtered, washed with water, and extracted with 100 cc. of methylene chloride. The resulting extract is washed with water, dried over magnesium sulfate, and concentrated by vacuum distillation. About 50 cc. of methanol are added and the mixture is again concentrated by vacuum distillation to eliminate the methylene chloride. The concentrated solution is cooled and filtered. After drying, 3.35 g. of the desired nitro compound are obtained, corresponding to a yield of 60% of the theoretical yield; melting point: 157° C., optical rotation:

$$[\alpha]_D^{20}=-104°$$

(concentration: 0.5% in chloroform). The compound is insoluble in water, slightly soluble in methanol, and soluble in ether, acetone, and chloroform.

*Analysis.*—$C_{25}H_{37}O_6N$; molecular weight: 447.55.—Calculated: 67.1% C; 8.3% H; 3.1% N. Found: 66.9% C; 8.3% H; 3.2% N.

(b) PREPARATION OF THE 3,17-DIPROPIONATE OF 5α-ANDROSTANE-3β,17β-DIOL-6-ONE 4.2 g. of the 6-nitro compound obtained as described hereinabove under (a) are dissolved in 170 cc. of 90% acetic acid. 16 g. of zinc powder are added thereto while stirring vigorously and the mixture is refluxed for one hour while stirring is continued. The reaction mixture is then cooled to room temperature. The zinc is filtered off, washed with acetic acid, and the filtrate is concentrated by evaporation to about one tenth of its original volume. 200 cc. of water are added. The mixture is extracted with methylene chloride. The extract is washed with water and sodium bicarbonate solution and dried over magnesium sulfate. The dried extract is then concentrated considerably and methanol is added. Thereafter part of the methanol is distilled off to eliminate the methylene chloride. After cooling with ice, the precipitate is filtered off and dried. 2.7 g. of the dipropionate of 5α-androstane-3β,17β-diol-6-one are obtained, corresponding to a yield of 70% of the theoretical yield. Its melting point is 188° C., its optical rotation $[\alpha]_D^{20} = -40°$ (concentration: 0.5% in chloroform). The compound is insoluble in water, slightly soluble in methanol, and soluble in ether, acetone and chloroform.

Analysis.—$C_{25}H_{38}O_5$; molecular weight: 418.55.— Calculated: 71.7% C; 9.15% H; 19.1% O. Found: 71.9% C; 9.0% H; 19.4% O.

(c) PREPARATION OF THE 6-METHYLENE-3,17-DIPROPIONYLOXY-5α-ANDROSTANE 2.7 g. of the 6-ketone compound obtained according to the procedure described hereinabove under (b) are treated according to the procedure described in Example (1a) with a reaction mixture containing 11.5 g. of triphenyl methyl phosphonium bromide in 125 cc. of benzene and 2.75 g. of phenyl lithium dissolved in 25 cc. of ether. After extraction as described in Example 1, and repropionylation of the extract with propionic acid anhydride and pyridine, the crude propionyl compound is taken up in 250 cc. of petroleum ether whereby a resin formed as by-product remains undissolved. The extract is passed through neutral aluminum oxide, the aluminum oxide is eluted first with petroleum ether and then with methylene chloride. Elution with methylene chloride yields, after evaporation to dryness, 2.7 g. of the desired crude 6-methylene compound. On recrystallization from petroleum ether (boiling range: 38–48° C.), the resulting pure compound melts at 128° C., its optical rotation: $[\alpha]_D^{20} = -29°$ (concentration: 0.5% in chloroform).

Analysis.—$C_{26}H_{40}O_4$; molecular weight: 416.58.— Calculated: 75.0% C; 9.7% H; 15.4% O. Found: 74.9% C; 9.7% H; 15.5% O.

This product is new.

(d) PREPARATION OF THE 3,17-DIPROPIONATE OF 6-METHYL-5α-ANDROSTANE-3β,17β-DIOL 1 g. of the dipropionate of 6-methylene-3,17-dipropionyloxy androstane obtained as described hereinabove under (c) is hydrogenated by following the procedure given in Example (1b) in the presence of 1 g. of palladium deposited on carbon black prepared as described hereinabove in Example (1b). After recrystallization from methanol, 0.52 g. of the 3.17-dipropionate of 6-methyl-5α-androstane-3β,17β-diol of the melting point 103° C. are obtained. For analytical purposes the compound is subjected to a second recrystallization from methanol. The compound is obtained in the form of colorless prisms of the melting point 105° C., optical rotation: $[\alpha]_D^{20} = -26°$ (concentration 0.5% in chloroform). The compound is insoluble in water and very soluble in acetone, benzene, and chloroform.

Analysis.—$C_{26}H_{42}O_4$; molecular weight: 418.6.—Calculated: 74.6% C; 10.1% H; 15.3% O. Found: 74.9% C; 9.9% H; 15.3% O.

This product is new.

In place of the 6-keto steroids employed as starting materials in the preceding examples, there may be used equimolecular amounts of other 6-keto steroids, such as 6 - keto trans-dehydroandrosterone, 6 - keto - $\Delta^{16}$ - pregnenolone, 6-keto desoxycholic acid esters and others whereby the corresponding 6-methyl steroid compounds are obtained.

I claim:
1. 3β-acetoxy-6-methyl cholestane.
2. The 3,17-dipropionate of 6-methyl-5α-androstane-3β,17β-diol.
3. 3β-acetoxy-6-methylene cholestane.
4. The 3,17 - dipropionate of 6 - methylene - 5α - androstane-3β,17β-diol.
5. In a process of producing a 6-methyl substituted steroid compound of the formula

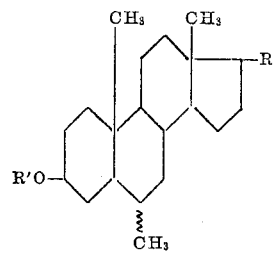

wherein

R is a member selected from the group consisting of a lower alkanoyloxy group and the hydrocarbon sidechain of a sterol, and
R' is a lower alkanoyl group;

the steps which comprise heating under reflux the 6-keto steroid compound of the formula

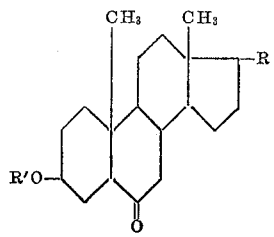

wherein

R and R' represent the same members as indicated above, with triphenyl methylene phosphonium bromide and phenyl lithium in an inert organic solvent, reacylating the resulting 6-methylene steroid compound, and catalytically hydrogenating said methylene steroid to the corresponding 6-methyl steroid.

References Cited in the file of this patent
UNITED STATES PATENTS 2,786,855  Sondheimer et al. _____ Mar. 26, 1957
2,865,808  Agnello et al. _____ Dec. 23, 1958

OTHER REFERENCES

Campbell et al.: J.A.C.S., vol. 80, pages 4717–21, 1958.
Sondheimer et al.: J.A.C.S., vol. 80, pages 3087–90, 1958.